April 28, 1964     E. CARNALL, JR., ETAL     3,131,025
ZINC SULFIDE OPTICAL ELEMENT Filed Oct. 29, 1959     2 Sheets-Sheet 1

Edward Carnall, Jr.
Paul B. Mauer
William F. Parsons
Donald W. Roy
INVENTORS

BY R. Frank Smith
Walter O. Hodsdon
ATTORNEYS

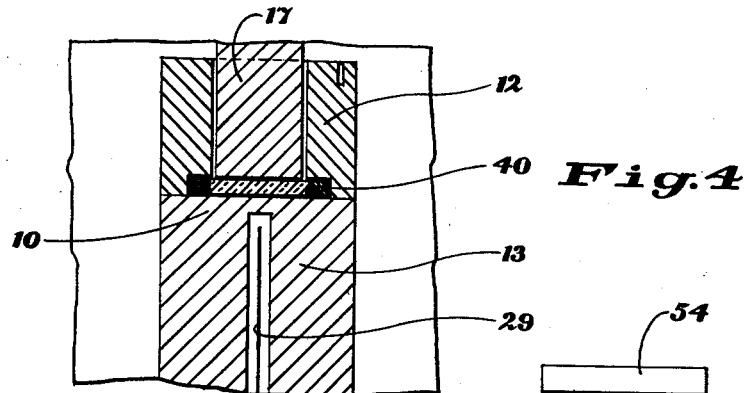
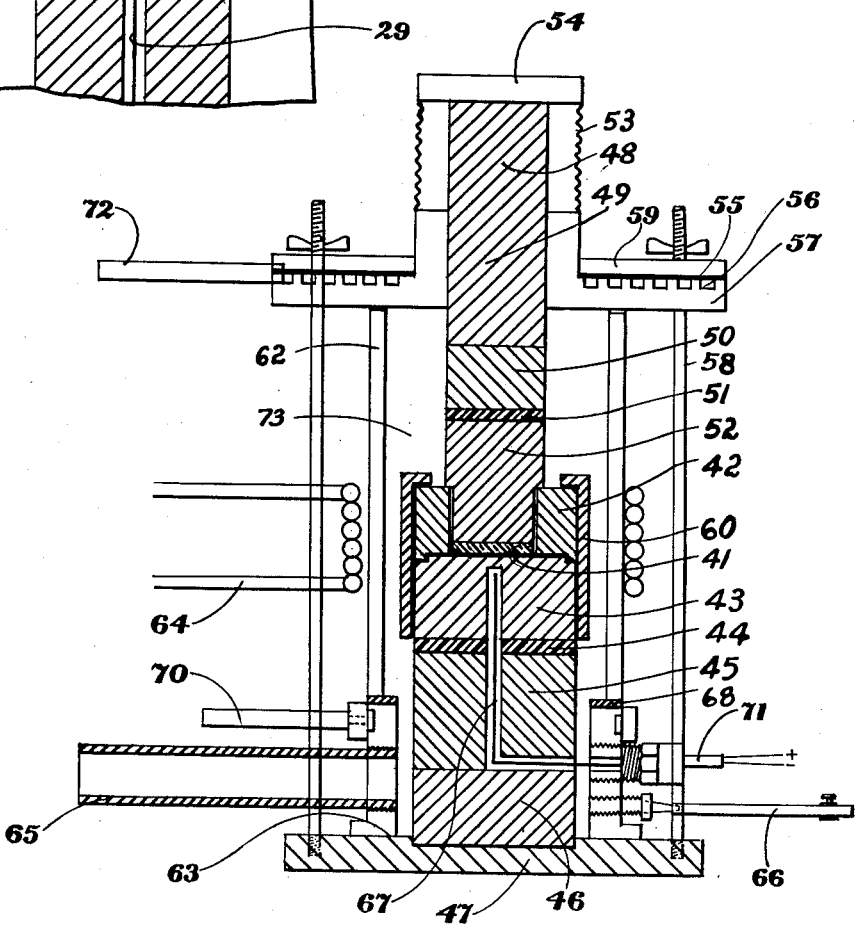
Fig. 4
Fig. 5
Edward Carnall, Jr.
Paul B. Mauer
William F. Parsons
Donald W. Roy
INVENTORS

United States Patent Office 3,131,025
Patented Apr. 28, 1964

3,131,025
ZINC SULFIDE OPTICAL ELEMENT
Edward Carnall, Jr., Paul B. Mauer, William F. Parsons, and Donald W. Roy, all of Rochester, N.Y., assignors to Eastman Kodak Company, Rochester, N.Y., a corporation of New Jersey
Filed Oct. 29, 1959, Ser. No. 849,606
3 Claims. (Cl. 23—135)

This invention relates to optical elements and to methods and apparatus for making optical elements. More particularly this invention relates to methods and apparatus for molding optical elements of various geometrical shapes which transmit over a broad range of the electromagnetic spectrum. These elements are characterized in that they have a polycrystalline structure. The present invention is illustrated by the description of the apparatus and method employed for molding a homogeneous solid of polycrystalline zinc sulfide.

Heretofore, zinc sulfide has been coated by vaporization in a vacuum onto various surfaces to achieve various optical effects. The transmission, thermal stability, and strength of such units are limited by the substrate upon which the zinc sulfide is deposited. There are no substrates available which possess all the properties required to provide an infrared transmitting window which is suitable for the severe conditions encountered in missiles, projectiles, satellites, and related devices.

An object, therefore, of the present invention is to provide an article of manufacture consisting of polycrystalline zinc sulfide.

Another object is to provide a homogeneous solid of molded zinc sulfide having a density of from 99% up to and including the theoretical density.

Still another object is to provide an optical element of molded polycrystalline zinc sulfide which transmits in the visible and infrared regions of the electromagnetic spectrum.

Yet another object is to provide an infrared transmitting element which will be suitable for use in missiles, projectiles, satellites and related devices.

Another object is to provide a method of molding zinc sulfide to form such optical elements.

Still another object of this invention is to provide novel aparatus for molding such transmitting elements.

Yet another object is to provide an infrared transmitting element or window consisting only of polycrystalline zinc sulfide.

A still further object is to provide an infrared window of molded polycrystalline zinc sulfide which is mounted in a metal or metal alloy mounting, the mounting having a coefficient of expansion similar to the coefficient of expansion of polycrystalline zinc sulfide.

Other objects will appear hereinafter.

In accordance with a feature of this invention zinc sulfide powder is pressed in a mold under conditions of high pressure, high temperature and high vacuum or in an atmosphere of inert gas into a dense molded unit of polycrystalline zinc sulfide. The mold may be of any suitable shape and can be provided with a mounting for the molded unit so that the molded unit becomes fixedly attached to the mounting during the molding process. Metal and alloy mountings may be employed.

In accordance with another feature of this invention, novel apparatus particularly adapted to mold zinc sulfide powder into a dense polycrystalline optical unit in a high vacuum or an inert atmosphere is provided.

A further feature of this invention is a method of molding zinc sulfide powder into a polycrystalline solid.

The invention will be further understood by reference to the following detailed description and drawings in which:

FIG. 4 is a section of a device similar to that shown in FIG. 3 in which a ring-like mounting member for the optical unit is shown positioned in the mold with the zinc sulfide within the ring;

FIG. 5 is an elevational view, partly in section, of another device for molding the zinc sulfide optical units which employs high frequency heating as the heating means.

Figure 3:
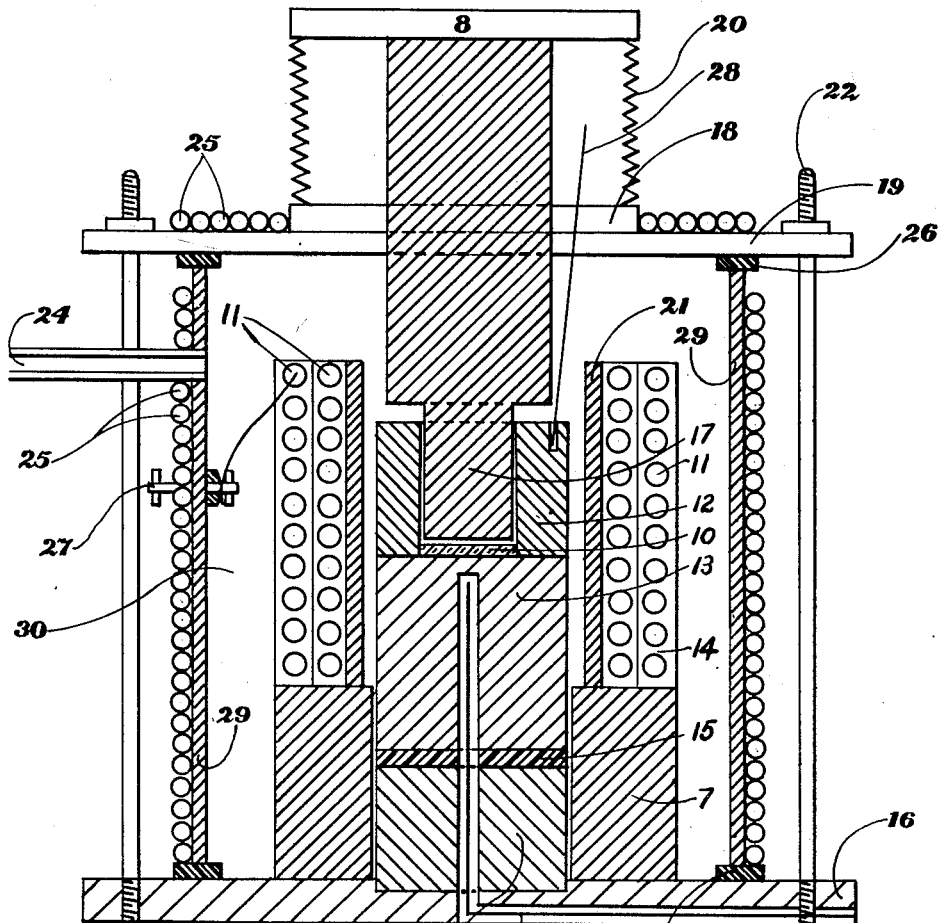
FIG. 3 is an elevational view, partly in section, of a device for molding the zinc sulfide powder in accordance with this invention.

The molding apparatus shown in FIG. 3 comprises a base 16, a silicone gasket 23, a block 9, a thermal insulator 15, a block 13, a molding cylinder 12, a molding plunger 17 having a head 8 which is adapted to be attached to a prime mover, not shown, such as the piston of a hydraulic press to move the plunger 17 vertically into and out of molding cylinder 12 and thereby press the zinc sulfide powder into the solid unit shown at 10.

The head 8 is attached to aligning ring 18 by metal bellows 20 thereby assuring a vacuum seal around the upper portion of the plunger 17.

A cylinder 21 encloses the molding cylinder 12 and plunger 17 and is supported on block 7. A heating unit 14 comprising a refractory casing is positioned around cylinder 21 and is also supported on block 7 and contains electric heating coils 11, the terminals for which are shown at 27. A cylinder 29 is positioned concentrically in respect to cylinder 21 and forms a vacuum chamber 30, the ends of which are closed by gaskets 23 and 26 and plates 16 and 19. Cooling coils 25 are positioned in contact with the outer surface of cylinder 29. A conduit 24 connects the vacuum chamber 30 to a suitable vacuum system not shown. The assembly is further secured by the coaction of top plate 19 and threaded rods 22 and base plate 16.

The temperature is measured by either one or by both of thermocouples 28 and 31 which are suitably located in channels respectively positioned adjacent the molding position.

The blocks 9, 13 and cylinder 12 may be made of molybdenum, molybdenum alloy, Nichrome or stainless steel.

The preferred operation of the device is as follows: Zinc sulfide powder is placed in the molding cylinder 12 beneath plunger 17 and the apparatus is assembled as shown in FIG. 3. The zinc sulfide is first cold pressed. A pressure of 10,000 pounds per square inch is exerted by the plunger 17 on the zinc sulfide powder for a few minutes to compact the powder into a firm compact. The plunger is then removed and any excess or loose powder is removed by the operator. This cold pressing operation serves to form a level charge and prevents powder from lodging between the plunger 17 and the wall of cylinder 12 or from flowing out between the cylinder 12 and block 13 during the subsequent hot molding step. The cold pressing of the zinc sulfide powder also enables the resulting compact to heat more easily since heat is conducted through the compact more efficiently than through unpressed powder.

However, suitable molded zinc sulfide molded pieces can be manufactured by omitting the above described preliminary cold pressing step and using only the hot molding procedures now described.

The molding apparatus is again assembled as shown in FIG. 3 and is now attached to a suitable vacuum system, not shown, by means of pipe 24 and chamber 30 is evacuated to 0.2 mm. to $1 \times 10^{-5}$ mm. of mercury. Cooling water is circulated through the cooling coils 25 from a source, not shown, and electric current is supplied to the heater coils 11 through leads 27. The temperature of the mold is monitored by means of platinum-rhodium thermocouples 28 and 31. When the temperature reaches 1550° F., molding force is applied to the head 8 of plunger 17 by a hydraulic press, not shown, and over a one-minute period or less pressure is built up to approximately 40,000 pounds per square inch.

The pressure on the zinc sulfide is maintained in this range for from 20 to 30 minutes while the temperature is held at 1550° F. During the heating up period, the equipment gases off and the vacuum falls to approximately 0.5 mm. but gradually recovers to the .2 mm. range as the adsorbed gases are driven off and expelled.

At the end of the pressing period, the electric power is shut off, the pressure is released over a period of a few seconds to several minutes and the apparatus allowed to cool, in an atmosphere of an inert gas such as argon which is introduced into the apparatus through pipe 24.

After a period of approximately 30 minutes, the temperature of cylinder 12 will fall to approximately 400° F. and the bolts 22 are removed and the plunger assembly and cylinder 12 and 21 are removed leaving the molded zinc sulfide unit resting on block 13. The molded zinc sulfide unit is permitted to cool to room temperature, i.e., 70° F.

The molded zinc sulfide window is then removed from the molding apparatus and employed as desired. It is a polycrystalline solid within the range of 99% up to theoretical density.

Figure 1:
FIG. 1 is a view of a round polycrystalline solid molded from zinc sulfide powder.
Figure 2:
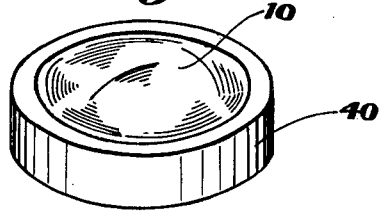
FIG. 2 is a view of a round polycrystalline solid of zinc sulfide which was molded and during the molding operation was mounted in a stainless steel mounting.

Referring to FIG. 4, the operation of the mold there shown is substantially the same as that of FIG. 3. However, a metallic ring 40 is placed concentrically in the bottom of cylinder 12 and the powdered zinc sulfide 10 is placed within the mounting ring 40. The pressing operation is conducted as described in connection with FIG. 3 and the result is a molded polycrystalline zinc sulfide window integrally mounted and hermetically sealed in the mounting ring as shown in FIG. 2. The mounting ring 40 may be of metal or an alloy such as No. 303 stainless steel or Viscotherm Alloy #5.

The above-described procedures give what appear to be optimum results. However, satisfactory windows and other molded optical units have been produced at temperatures varying from 1420° F. to 1770° F. Windows made at temperatures above 1575° F. tend to scatter light and reduce transmission in the short wavelength infrared. Conversely, windows made at temperatures below 1525° F. tend to give improved short wavelength infrared transmission but are somewhat inferior in transmission for the longer wavelengths. However, satisfactory windows may be made in the 1420° F. to 1770° F. temperature range stated above depending upon whether the application requires good short wavelength infrared or longer wavelength infrared transmission.

Pressures have been varied from about 15,000 p.s.i. to 67,000 p.s.i. Pressures less than 20,000 p.s.i. may result in a molded unit of inferior quality. Any pressure in excess of the optimum 40,000 p.s.i. does not seem to contribute to the quality of the molded unit.

The time at pressing temperature has been varied within the limits of five to sixty minutes. At time less than five minutes, the molded unit may not be completely pressed. Time in excess of thirty-five minutes does not contribute to the quality of the product.

The zinc sulfide used imposes limits on the hot pressing operation. It is known that a material of high purity and of particle size of around 5 microns gives good results whereas larger crystals and lower purity give unsatisfactory results.

Limits are imposed on hot pressing by the available mold materials. Plunger 17, cylinder 12 and block 13 must all be strong at high temperatures. Molybdenum and ceramics such as high density alumina are satisfactory at 1550° F. under compression of the order involved in this work. However, since the zinc sulfide flows sufficiently under pressing conditions to exert forces of several thousand pounds per square inch on the cylinder 12, the cylinder must have high tensile strength. Cylinders made of ceramics must be quite massive to repeatedly withstand such conditions. Molybdenum cylinders can be somewhat less massive. For pressing discs ¾ inch in diameter and few millimeters thick, wall thickness of cylinder 12 of the order of ¼ and ⅝ inch are required for molybdenum and at least an inch of wall is required for alumina.

A major problem in the hot pressing work is the unwanted bonding between mold parts and the unwanted bonding between zinc sulfide and mold parts. Cylinders and plungers made from either molybdenum or alumina do not tend to bond together. Of the two materials zinc sulfide shows less tendency to bond to molybdenum than it does to alumina. Block 13 can be made of molybdenum or alumina.

Referring to FIG. 5, an elevational view, partly in section, another modification of the molding apparatus is shown. This modification employs high frequency heating. In general, however, the parts of the apparatus are similar in kind and operation to that shown in FIG. 3.

The pressed zinc sulfide powder is shown at 41. The apparatus comprises molding cylinder 42, molding block 43, insulator 44 and supporting blocks 45 and 46. Block 46 rests on base 47. A graphite sleeve 60 is positioned between induction heating coils 64 and members 42 and 43. Also positioned on base 47 is a cylindrical water chamber 63 through which vacuum conduit 65, a vacuum release conduit 66 and a thermocouple conduit 71 extend. A water pipe 70 connects the water chamber 63 to a water supply, not shown. The thermocouple is shown at 67. A quartz cylinder 62 is positioned on member 63 and separated therefrom by a gasket 68. Cylinders 62 and 63 thus form a vacuum chamber 73, the upper portion of which is closed by plate 57 having water cooling channels 56 therein. A gasket 55 forms the upper surface of the channels 56 and is held in position by clamping plate 59. The assembly is clamped by a plurality of clamping rods 58 and cooperating wing nuts.

The molding plunger 48 extends through an aligning aperture in plate 57. Freedom of motion of the plunger and a vacuum seal are achieved by means of the metal bellows 53, the ends of which are sealed respectively to the head 54 of the plunger 48 and to plate 57.

The molding plunger 48 comprises three sections; section 49 is preferably made of stainless steel, section 50 of Nichrome, and section 52 of molybdeum. An insulator 51 is positioned between sections 50 and 52.

In the apparatus of FIG. 5, the cylinder 42, plunger 52 and block 43, it would be desirable that these parts be made of a material which will couple with the high frequency field. In other words, a metal which couples efficiently rather than an inefficient metallic coupler or a dielectric material should be employed for these parts. The top and bottom plates 57 and 59 and the base plate 47 may be of aluminum. Blocks 42 and 43 preferably are of molybdenum and block 45 of Nichrome and 46 of stainless steel. The insulators 44 and 51 are of transite. The apparatus of FIG. 5 is operated at substantially the same temperature, pressure and vacuum as described above, but due to the high frequency heating, the time for heating up to molding temperature is reduced to about five minutes.

Since it is sometimes desirable to use metal mold materials which do not couple the high frequency field efficiently, one often employs a graphite sleeve 60 which fits snugly over the molding cylinder. The high frequency field couples and heats the graphite which in turn heats the molding cylinder by thermal conduction. When employing a molding cylinder which couples the high frequency field efficiently, the graphite shield need not be used.

The apparatus of FIG. 5 can, of course, also be employed to mold mounting rims onto the zinc sulfide molded windows in the general manner described in connection with FIG. 4 by suitable modification of the molding cylinder and plunger. The apparatus of FIG. 5 is operated at substantially the same temperature, pressure and vacuum as described above, but due to the high frequency heating, the time for heating up to molding temperature is reduced to about five minutes.

Fundamental physical principles reveal that a mass of small individual particles result in a high energy state. The smaller the particles, the higher the total area of the mass and the higher the surface-free energy. A mass of very small particles has a large surface area and a high surface-free energy. Both the high degree of disorder and the high surface area contribute to this high energy condition. On the other hand, such particles joined together to form a perfect crystal with its maximum of order and minimum of surface area result in a minimum of energy. Such a system will tend to go from the high energy state to the minimum energy state. This is the driving force in these reactions.

At elevated temperatures, chemical bonds are established between adjacent particles which are identical with or closely resemble the bonds between atoms or ions within the bulk of the crystal. This union lowers the surface-free energy of the particles, but due to the small area of contact, the surface-free energy still remains high, and it is further lowered by surface diffusion and volume diffusion of atoms or ions so that there is a maximum area of contact between the particles with the accompanying lowering of surface area and surface energy. In the case of hot pressing, as the phrase implies, pressure is brought to bear on the particles. This has the additional effect of causing plastic flow within individual particles and within the boundaries established between adjacent particles which results in further compacting and an accompanying density increase of the mass of particles. Plastic flow is very active under conditions of high pressure. When properly carried out, a mass of highly scattering particles can be joined into a mass which is optically homogeneous to infrared light of wave length greater than 2 microns.

Due to plastic flow, the crystals are subjected to a treatment similar to work hardening which, we believe, results in a material which is stronger than a presently attainable single crystal would be.

Zinc sulfide powder may be hot-pressed in numerous geometrical shapes and sizes. Cylindrical pieces varying in diameter from ½ inch to 2 inches and up to ¾ inch thick have been pressed. Hemispherical domes up to 2 inches in diameter have been pressed successfully. Small plano-convex lenses .170 inch in diameter have been made. By using carefully polished molds with accurate radius of curvature, these lenses may be pressed accurately to dimension without further finishing operation required. Test plate analysis has shown that these lenses may be pressed to within one Newton interference ring of the desired radius of curvature by this method. It has also been found that by using a die containing several spherical cavities, these lenses may be pressed in clusters from which several individual lenses may be cut.

Thus, it appears that the size and shape of hot-pressed zinc sulfide pieces is not limited and that large diameter pieces and intricately shaped pieces may be made. Also, the principle of making lenses in clusters may be applied to larger lenses or domes and pieces of other geometrical shape.

*Physical and Optical Properties of Hot-Pressed Zinc Sulfide*

Hot-pressed zinc sulfide is yellow in color. Windows that are hot-pressed in the lower temperature range transmit considerable visible light and are nearly scatter free in appearance and are of substantially theoretical density. Hot-pressed windows transmit progressively less visible light as the hot-pressing temperature is increased. Concerning infrared transmission, samples have been prepared that have shown nearly theoretical transmission from 2 microns to 13 microns. For example, a sample 1.6 mm. thick had the following transmissions at various wavelengths.

| Wavelength: | Percent transmission |
|---|---|
| 2 microns | 68 |
| 4 microns | 75 |
| 6 microns | 75 |
| 8 microns | 75 |
| 10 microns | 74 |
| 12 microns | 71 |
| 13 microns | 66 |

Since the refractive index of zinc sulfide is comparatively high, reflection loss is quite high. Reflection loss has been calculated to be about 25%. If this value is added to transmission values in the table above, it may be seen that transmission is 100% over nearly all of the wavelength range shown.

Reflection losses may be substantially reduced by properly chosen anti-reflection coatings.

Hot-pressed zinc sulfide is worked easily by conventional methods of optical grinding and polishing.

Hot-pressed zinc sulfide has been shock tested by quenching from 392° F. to room temperature water without cracking or other failure.

Samples have been heated in air at 932° F. for ten minutes with very little oxidation or other changes. They have been heated in air at 725° F. for 1½ hours with very little change.

Refractive index measurements have been made on hot-pressed samples of zinc sulfide. This data is summarized in the table below.

| Wave length: | Refractive index |
|---|---|
| 1.0140 microns | 2.286 |
| 1.5295 microns | 2.266 |
| 2.0 microns | 2.259 |
| 3.0 microns | 2.252 |
| 4.0 microns | 2.246 |
| 5.0 microns | 2.241 |
| 6.0 microns | 2.234 |
| 7.0 microns | 2.226 |
| 8.0 microns | 2.217 |
| 9.0 microns | 2.206 |
| 10.0 microns | 2.194 |
| 11.0 microns | 2.181 |

Approximate coefficient of expansion measurements have been made on hot-pressed samples of zinc sulfide. This data is summarized in the table below:

| Temperature range: | Coefficient of expansion |
|---|---|
| 77–572° F | $3.8 \times 10^{-6}/°$ F. |
| 77–936° F | $4.4 \times 10^{-6}/°$ F. |
| 77–1488° F | $5.0 \times 10^{-6}/°$ F. |

We claim:

1. A transparent article consisting of composite zinc sulfide particles of not more than 5 microns size formed by hot pressing the particles into a unitary polycrystalline homogeneous solid of at least 99% of theoretical density.

2. An article which transmits radiation in the infrared region of the electromagnetic spectra consisting of articles of zinc sulfide joined by hot pressing powdered particles of not more than about 5 micron size, said article being a unitary polycrystalline solid having substantially homogeneous crystalline areas and a density of at least 99% theoretical density.

3. An article of manufacture consisting of a homogeneous unitary solid of polycrystalline zinc sulfide hot pressed from powdered particles of zinc sulfide of less than about 5 micron size, said article having specular transmission in the visible and infrared region of the electromagnetic spectrum and a density in the range of 99% up to and including theoretical density.

References Cited in the file of this patent

UNITED STATES PATENTS

| | | |
|---|---|---|
| 2,020,313 | Holstein et al. | Nov. 12, 1935 |
| 2,020,323 | Mitchell et al. | Nov. 12, 1935 |
| 2,091,569 | Ridgway et al. | Aug. 31, 1937 |
| 2,332,674 | Smith | Oct. 26, 1943 |
| 2,335,325 | Wainer | Nov. 30, 1943 |
| 2,420,168 | Dimmick | May 6, 1947 |
| 2,422,954 | Dimmick | June 24, 1947 |
| 2,544,414 | Bridgman et al. | Mar. 6, 1951 |
| 2,858,240 | Turner et al. | Oct. 28, 1958 |

OTHER REFERENCES

Pfund: Article in "Journal of the Optical Society of America," vol. 24, No. 4, pages 88–102 (1934).

Dana: Textbook of Mineralogy, 4th Edition (1932), John Wiley and Sons, pages 421–423.

Mellor: A Comprehensive Treatise on Inorganic and Theoretical Chemistry, vol. 4 (1923), Longmans, Green and Company, pages 586–602.